Aug. 7, 1962     G. A. BILOCQ     3,048,285
LOG FEEDING MACHINE

Filed April 17, 1961     4 Sheets-Sheet 1

INVENTOR
Georges A. BILOCQ

ATTORNEYS

Aug. 7, 1962  G. A. BILOCQ  3,048,285
LOG FEEDING MACHINE
Filed April 17, 1961  4 Sheets-Sheet 2

INVENTOR
Georges A. BILOCQ
BY
ATTORNEYS

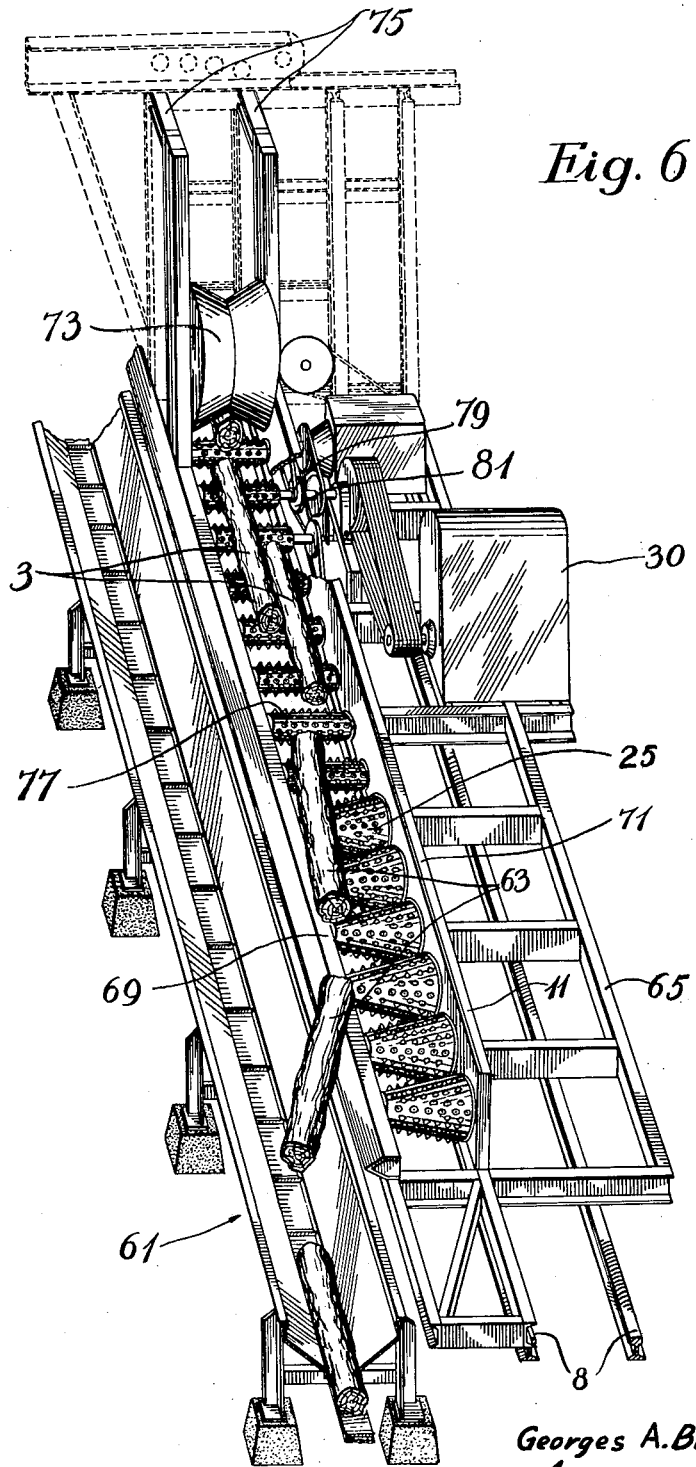

United States Patent Office 3,048,285
Patented Aug. 7, 1962

3,048,285
LOG FEEDING MACHINE
Georges A. Bilocq, Plessisville, Quebec, Canada, assignor to Forano Limited, Plessisville, Quebec, Canada
Filed Apr. 17, 1961, Ser. No. 103,500
3 Claims. (Cl. 214—83.18)

This invention relates to a log feeding machine for directing logs, fed into a hopper, onto a conveyor which will take them to a plant for further operations. More specifically, the invention pertains to a conveying machine which receives and aligns the logs and deflects them into the aforesaid conveyor.

In the wood industry, particularly the pulp and paper industry, logs are stacked up on piles in a yard during the cutting season and are thereafter directed to the plants for processing as the requirements arise. The invention pertains to an improvement in the machine used to move the logs from the pile onto a fixed conveyor leading to the plants.

The machine normally travels on rails which run adjacent to, and parallel, to the fixed conveyor. The improvement lies in the provision of a machine having a hopper section provided with an inclined lateral wall which is made to vibrate and drive the logs to a bottom part which is itself a conveyor directing the logs to the conveyor section proper. This latter section is made up of a series of cylindrical rollers mounted between two side members in conveyor fashion: the said rollers being rotated at progressively increasing speed so that logs travelling thereon will align themselves one behind the other.

A further improvement resides in the provision of a second series of rollers; the latter being frusto-conical in shape. These conical rollers follow the cylindrical ones and by sloping in a common direction, they deflect the incoming logs onto the fixed conveyor extending sideways of the machine.

The hopper section may also have another lateral wall opposed to the aforesaid inclined wall, which is pivotable away from the bottom part for a purpose to be indicated later.

Figure 5:
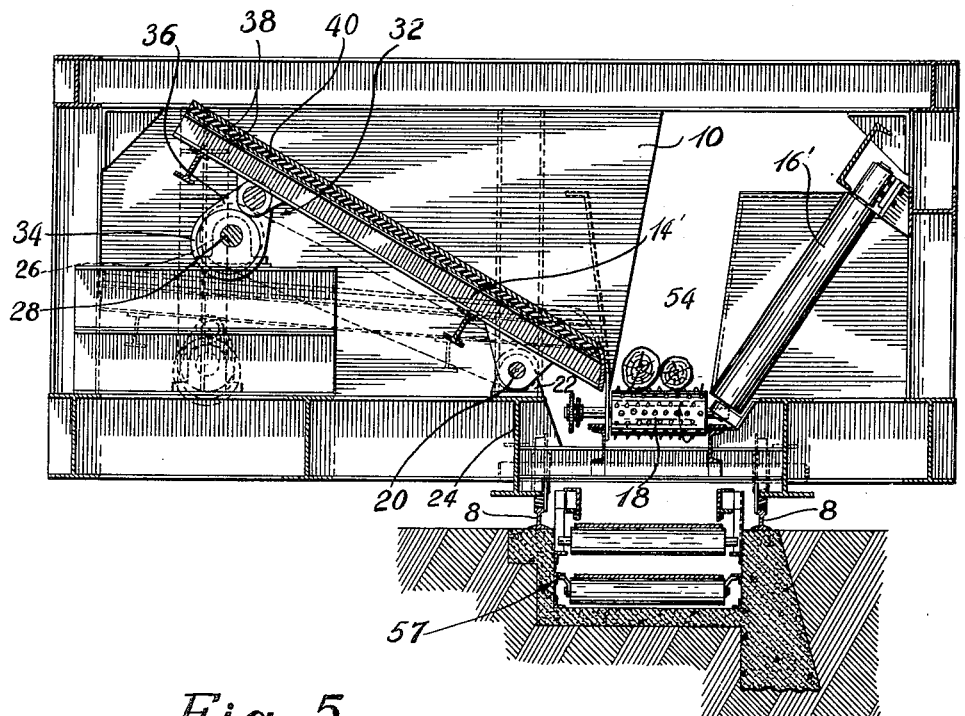
Figure 1:
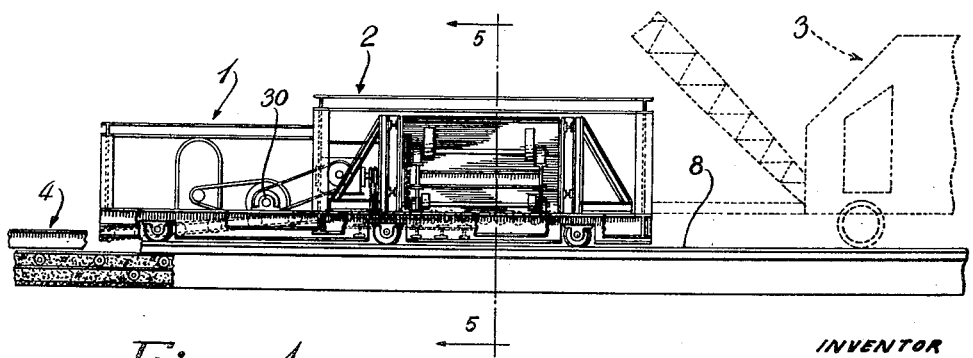
Figure 3:
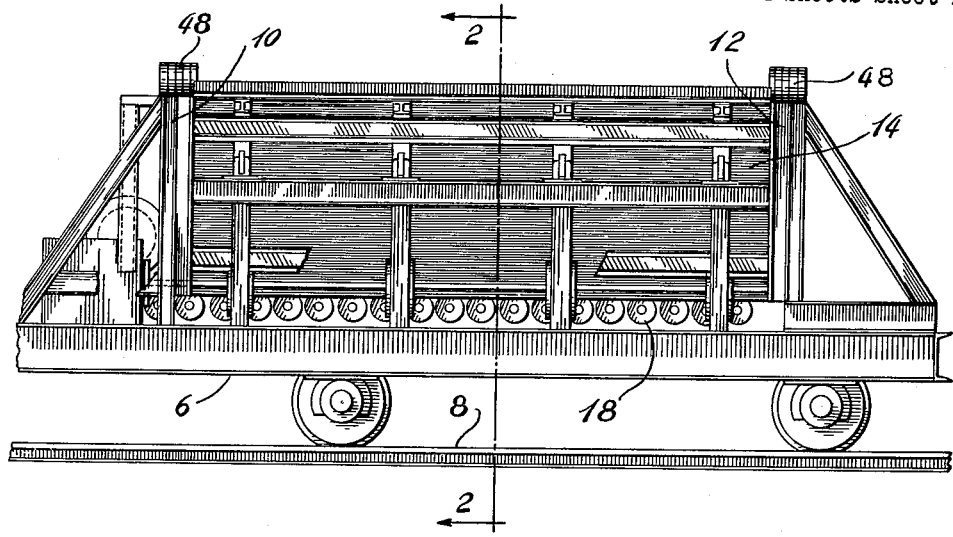
Figure 2:
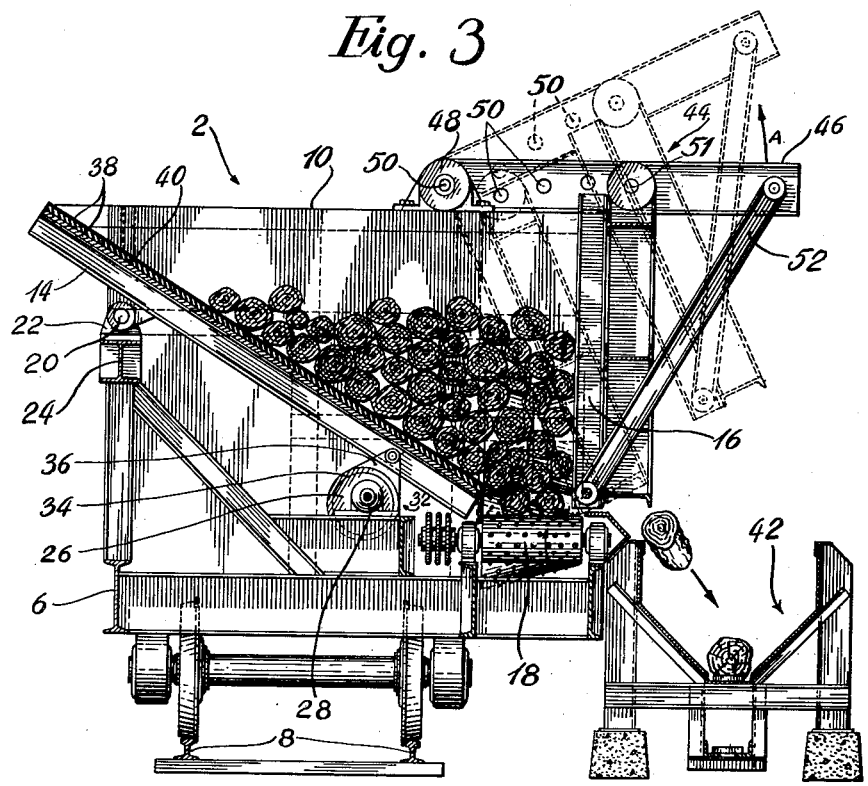
Figure 4:
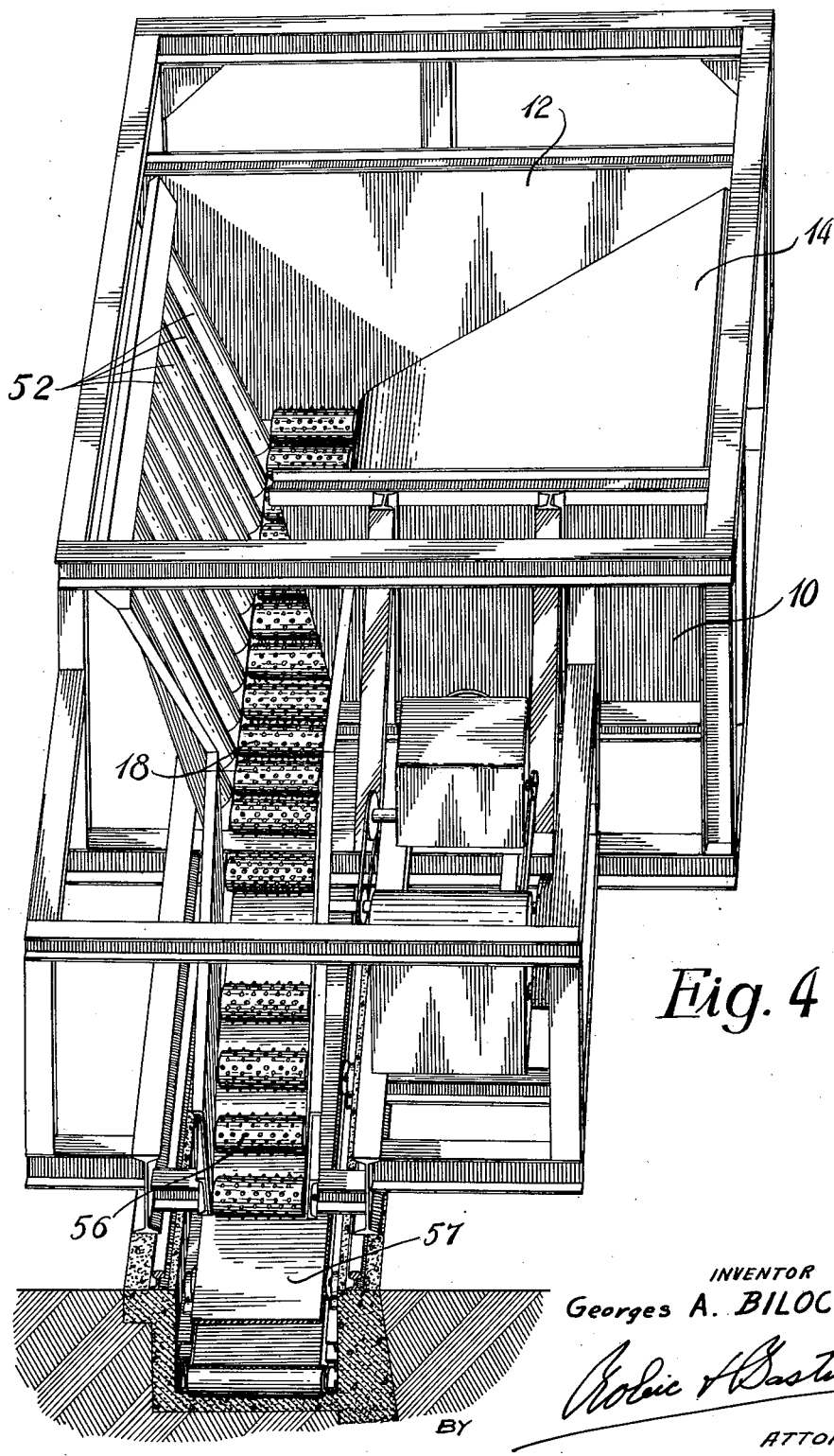

The description that follows will offer a better understanding of the invention; reference being had to the accompanying drawings wherein:

FIG. 1 is a general elevation view of the complete machine of the invention,

FIG. 2 is a section across the hopper section of the feeding machine, taken along line 2—2 of FIG. 3, FIG. 3 illustrates, in elevation, a side view of the hopper section of the machine, FIG. 4 is a perspective elevation view of a modified form of hopper section, FIG. 5 shows a section of the modified embodiment of FIG. 4, and FIG. 6 illustrates, in perspective elevation, the conveyor section of the machine.

The complete machine is shown in FIG. 1 and comprises a forward conveyor section 1 coupled to a rearward hopper section 2. The hopper is fed by means of a crane 3, shown in dotted lines. Both the feeding machine and crane are mounted on rails with run alongside a log conveyor 4 leading into the plants. These rails and conveyor are located near log piles and the machine is moved as the piles become depleted.

One embodiment of the hopper section is illustrated in FIGS. 2 and 3. It consists of a sub-frame 6, suitably equipped to roll on rails 8, onto which is built the hopper proper. The latter is generally made of upright front and rear walls 10 and 12 respectively, extending transversally of subframe 6, of lateral side walls 14 and 16 and finally of bottom part 18.

First lateral wall 14 is inclined to drive the logs toward the bottom part 18. In order to insure more positive arriving of the logs at the bottom of the hopper, the lateral wall 14 is made to vibrate. This may be done by mounting one end of wall 14 onto a shaft 20 which is journaled in bearings 22 mounted on brackets 24 on each of the front and rear walls 10 and 12. Vibration is obtained by the use of at least one eccentric desk 26 which is fixed to a shaft 28 driven into rotation by a motor 30 (FIGS. 1 and 6) on the conveyor section 1. The disk 26 itself is guided into a bearing 32 having the form of a ring 34 with a lateral projection 36 pivotally secured to a structural member of wall 14. It should be noted that the same arrangement is provided on the hopper of the embodiment of FIG. 5, except that in this case the wall 14 is vibrated at the top and pivoted at the bottom, whereas, in FIG. 2, the reverse is true. Of course, in either case, the arrangement is interchangeable.

Since the wall 14 actually receives the logs and that the latter are often dropped from a certain height, the service is rather severe and it is suggested that its life span can be considerably increased by building it of two steel plates 38 between which is inserted a sheet of hard rubber 40.

The bottom part 18, into which are dropped the logs from vibrating lateral wall 14, is made up of a plurality of cylindrical rollers which are preferably spiked so as to more positively grip the logs and prevent slipping. The rollers are driven into constant rotation and carry the logs into the conveyor section from where they will be dropped into the log conveyor 42 which guides them into the plant.

The other lateral wall 16 is a heavy, steel fabricated structure which hangs freely from and is secured to supporting means 44 fixed at the top of front and rear walls 10 and 12. Wall 16 rests, by its own weight, adjacent the bottom part 18 against the pile of logs, as shown in FIG. 2.

As shown in dotted lines in FIG. 2, supporting means 44, and thus second lateral wall 16 can be pivoted and the wall 16 swung outwardly away from the logs. This is found advantageous when the logs are blocked into the hopper section and refuse to be driven into the conveyor section.

The supporting means consists of a supporting member 46, pivoted at one end, to bearings 48 by means of shaft 50. Bearings 48 are fixed to front and rear walls 10 and 12.

The upper end of wall 16 is removably secured to this supporting member 46 by known means including a pin 51 insertable in a hole 50 in supporting member 46. A series of such holes 50 is provided and disposed in an arc of circle whose center lies on the bottom edge of wall 16 which can then be selectively moved from one hole to another while the bottom edge remains stationary. The inclined position attained by wall 16 when in the innermost hole is shown in dotted lines in FIG. 2. The arc of circle lies inwardly of the hopper proper so that in using the other holes, the wall becomes inclined inwardly as shown.

Wall 16 is further stiffened and more integrated to supporting member 46 by the use of the brace 52.

The force of wall 16 and its ability to retain logs into the hopper is increased by the lever arm provided by supporting member 46 pivoting around shaft 50 located inwardly of the hopper.

We now come to the other embodiment of the hopper section, shown in FIGS. 4 and 5.

In this embodiment, the vibrating wall 14' is identical to vibrating wall 14 of FIG. 2 except that the pivoting and vibrating means are reversed, in this second case. But all elements repeat themselves in both cases.

Lateral wall 16' however is of a different nature than lateral wall 16 of FIG. 2. It is upwardly inclined and made up of a series of rollers 52 rotatable about upstanding inclined parallel axes. This embodiment is also provided with a bottom section 18 as in FIG. 2, which consists of a series of parallel spiked rollers driven at constant uniform speed.

The logs are discharged, through a suitable opening 54 into the conveyor section. In the embodiment of FIG. 5, this conveyor section 56 is merely a continuation of the bottom part 18 and runs over and discharges into a built-in-place conveyor 57 which can be a belt conveyor as shown. As aforesaid conveyor 57 is meant to run alongside the log piles and in this particular embodiment, would be built of concrete and poured between the rails 8.

A preferred form of conveyor section is that illustrated in FIG. 6. It is meant to be used with a standard conveyor 61 which is fixed to the ground and normally lies adjacent to the piles of logs. It is narrow and therefore adapted to carry logs 63 in alignment one behind the other as is often required for further operations.

This conveyor section has the dual purpose of placing the logs in alignment then deflecting them into conveyor 61. It consists of a frame 65 which is a continuation of hopper section 2 and is also displaceable on rails 8. The frame includes longitudinal side members 69 and 71 between which logs 63 temporarily travel.

A guide wheel 73 is used to give a first orientation to the logs and force them in a direction parallel to side members 69 and 71. For this purpose, guide wheel 73 is provided with a V-shaped groove along its periphery and is mounted, for rotation on a horizontal axis, on two upright parallel wheel supports 75.

Between side members 69 and 71 are provided a first group of rollers 77, cylindrical in shape and rotatable on parallel axes and mounted on members 69 and 71. To more positively move the logs, the cylindrical rollers are preferably spiked.

As mentioned previously, rollers 77 are driven into rotation at gradually increasing speed which permits log alignment, one behind the other. This gradually increasing speed may be obtained, for instance, by using on each roller shaft a small and a large sheave 79 and 81 respectively; the small sheave 79 receiving power from the large sheave 81 of the preceding shaft, and a large sheave 81 on that same shaft transmitting power to the small sheave 79 of the next shaft. In order to obtain constant acceleration, the diameters of the small sheaves must be equal and, similarly, the diameters of the large sheaves must also be equal. A motor 30 suitably coupled to one of the roller shafts will provide the necessary power.

Deflection of logs 63 is obtained by means of frusto-conical spiked rollers 85 mounted for free rotation between side members 39 and 71. These rollers are, of course, all sloping towards side wall 69 so as to force logs 63 off the machine and in conveyor 61. They have been found far superior to a single deflecting plate as they will more smoothly direct the logs. With a plate, it was often observed that the change of direction was of necessity, too abrupt and pronounced with the result that some of the logs often went over conveyor 61, to the ground.

Although the invention has been exemplified in two specific embodiments, the scope thereof should only be construed from the appended claims.

What I claim:

1. A log feeding machine comprising: a hopper section, adapted to receive logs horizontally and in the longitudinal direction, and having two opposite lateral walls, the planes of which extend transversely of said direction; a bottom conveyor part to which said walls lead; said hopper section further including upstanding front and rear walls; a supporting member extending along the top of each of said front and rear walls and having one end pivotally connected thereto inwardly of said lateral walls; one of said lateral walls being removably secured to said supporting members at a distance from said pivoting ends; each supporting member having a series of supporting means disposed along an arc of circle whose center is along the bottom edge of said second lateral wall; said arc of circle extending away from said pivoted end of said supporting member; said supporting means serving to secure said lateral wall to said supporting member in selective positions.

2. A machine as claimed in claim 1, including means for causing vibration of the other of said lateral walls and comprising: a rotatable shaft at one end of said wall; a disk eccentrically fastened on said shaft for motion therewith and means pivotally mounting said wall at the other end thereof.

3. A machine as claimed in claim 1, wherein said bottom conveyor part discharges into a conveyor section integral with said hopper section; said conveyor section comprising: a speed up area formed of a series of rollers driven into rotation on parallel axes at progressively increasing speed and a deflecting area in alignment with said speed-up area composed of a series of frusto-conical rollers freely rotating on axes parallel to said first mentioned axes and sloping in a common direction to deflect logs sideways and off the machine.

References Cited in the file of this patent

UNITED STATES PATENTS

| | | |
|---|---|---|
| 653,506 | Edwards | July 10, 1900 |
| 657,666 | Melby | Sept. 11, 1900 |
| 833,761 | Stevens | Oct. 23, 1906 |
| 1,513,576 | Benbow | Oct. 28, 1924 |
| 1,712,495 | Farrell | May 14, 1929 |
| 2,430,517 | Lunde | Nov. 11, 1947 |
| 2,732,958 | Bonanno | Jan. 31, 1956 |
| 2,870,923 | Jewell | Jan. 27, 1959 |